(12) United States Patent
Häggander et al.

(10) Patent No.: US 6,920,750 B2
(45) Date of Patent: Jul. 26, 2005

(54) ROCKET ENGINE MEMBER AND A METHOD FOR MANUFACTURING A ROCKET ENGINE MEMBER

(75) Inventors: Jan Häggander, Trollhattan (SE); Jan Lundgren, Grundsund (SE); Mats Hallqvist, Grastorp (SE)

(73) Assignee: Volvo Aero Corporation, Trollhättan (SE)

( * ) Notice: Subject to any disclaimer, the term of this patent is extended or adjusted under 35 U.S.C. 154(b) by 18 days.

(21) Appl. No.: 10/604,327

(22) Filed: Jul. 11, 2003

(65) Prior Publication Data

US 2004/0139721 A1 Jul. 22, 2004

Related U.S. Application Data

(63) Continuation of application No. PCT/SE02/00026, filed on Jan. 9, 2002.
(60) Provisional application No. 60/261,044, filed on Jan. 11, 2001.

(30) Foreign Application Priority Data

Jan. 11, 2001 (SE) .............................................. 0100079

(51) Int. Cl.[7] .......................... F02K 11/00; B64D 33/04; B21D 53/00
(52) U.S. Cl. .................... 60/267; 239/127.1; 29/890.01; 29/890.14
(58) Field of Search ................ 60/267, 266; 239/127.1, 239/127.3; 29/890.01, 890.142

(56) References Cited

U.S. PATENT DOCUMENTS

| 2,968,918 | A | | 1/1961 | Denison |
| 3,690,103 | A | | 9/1972 | Dederra et al. |
| 4,584,171 | A | * | 4/1986 | Niino et al. ................... 419/8 |
| 4,924,653 | A | * | 5/1990 | Oly ............................... 53/66 |
| 5,546,656 | A | | 8/1996 | Hartman et al. |
| 6,467,253 | B1 | * | 10/2002 | Haggander ................... 60/267 |

FOREIGN PATENT DOCUMENTS

| GB | 904887 A | 9/1962 |
| WO | WO 9529785 A1 | 11/1995 |

* cited by examiner

*Primary Examiner*—Charles G. Freay
(74) *Attorney, Agent, or Firm*—Novak Druce & Quigg, LLP

(57) ABSTRACT

Method and arrangement for providing liquid fuel rocket engine member (10). The member forms a body of revolution having an axis of revolution and a cross section that varies in diameter along said axis. The wall structure includes a plurality of cooling channels (11). The outside of the wall structure includes a continuous sheet metal wall (14). The cooling channels (11) are longitudinally attached to the inside of the sheet metal wall. The method for manufacturing the rocket engine member (10) includes the steps of forming a sheet metal wall (14) having a wall section corresponding to the desired nozzle section, providing a plurality of channel members (15), and attaching the channel members (15) to the inside of the sheet metal wall (14).

28 Claims, 3 Drawing Sheets

ROCKET ENGINE MEMBER AND A METHOD FOR MANUFACTURING A ROCKET ENGINE MEMBER

CROSS REFERENCE TO RELATED APPLICATIONS

This application is a continuation patent application of International Application No. PCT/SE02/00026 filed 9 Jan. 2002 which was published in English pursuant to Article 21(2) of the Patent Cooperation Treaty, and which claims priority to Swedish Application No. 0100079-3 filed 11 Jan. 2001 and to U.S. Provisional Application No. 60/261,044 filed 11 Jan. 2001. Said applications are expressly incorporated herein by reference in their entireties.

BACKGROUND OF INVENTION

1. Technical Field

The present invention relates to a rocket engine.

2. Background of the Invention

During operation, a rocket combustion chamber or a rocket engine nozzle is subjected to very high stresses, for example in the form of a very high temperature on its inside (on the order of magnitude of 980° F.) and a very low temperature on its outside (on the order of magnitude of −370° F.). As a result of this high thermal load, stringent requirements are placed upon the choice of material, design and manufacture of the outlet nozzle. At a minimum, the need for effective cooling of the combustion chamber or the outlet nozzle must be considered.

It is a problem to construct cooled wall structures that are capable of containing and accelerating the hot exhaust gas, and also be reliable through a large number of operational cycles. Known designs do not have a sufficiently long service life required to withstand a large number of operational cycles. These known systems generate large thermal stresses, including large pressure drops, or present difficulties when needing repair.

When applying the expander engine cycle, there is a secondary problem. The expander engine cycle uses the cooling medium to drive the turbines in the fuel and oxidator turbo pumps; that is, energy from the expansion of the heated cooling medium is used for driving the turbines. The efficiency of the rocket engine is a function of the combustion pressure. To reach high pressure experience in the expander cycle, efficient heat transfer from the exhaust gas to the cooling medium is required. Increase in the heat load in the combustion chamber due to surface roughness or fins may impair the service life of the engine since the intensity of the heat load is very high in the combustion chamber. Still further, a longer combustion chamber increases the length of the engine and the rocket. A commensurate increase in the size of the nozzle gives rise to larger nozzles and longer rocket structures, each of which increases the weight of the vehicle.

There are several different known methods for manufacturing a rocket nozzle with cooling channels. According to one of these methods, the nozzle has a brazed tube wall. The tubes have a varying cross-sectional width to provide the contour of the nozzle when assembled. The variation in cross section is given by variation of the circumference and by variation of the form of the cross section. The brazed joints restrict the deformation of tubes in the thermal expansion and pressure cycle. The stresses in the tubes are increased in the arc of the joints. The joints themselves are weak points that may break and are difficult to repair. The brazed tube wall provides a larger "wet" contact surface for the rocket flame than a sandwich wall or a constant tube section wall. However, even larger wet surfaces are desirable.

According to another known method, a sandwich wall is made by milling channels in sheet metal and joining a thinner sheet metal to seal the channels. The inner and outer walls are continuous shells. In the thermal cycle, the walls are in compressive and tension strain. This type of wall structure is not well suited to sustain the tension loads normal in the service life of a rocket nozzle. The sandwich wall features no increase in surface area to enhance heat transfer.

According to still another known method, the nozzle wall is manufactured with constant section tubes. The tubes are helically wound and welded together to form the nozzle contour. The increase in surface area is small. The tubes have an angle relative to exhaust gas flowing through the nozzle. This helps to increase the heat transfer. However, at the same time the exhaust flow is rotated and a reactive roll momentum influences the flight of the rocket. The constant section tubes result in a large pressure drop that is not favorable for convectively cooled engines. The large pressure drop is negative for the expander cycle type engine.

SUMMARY OF INVENTION

An objective of the present invention is to provide an improved method for manufacturing a cooled rocket engine member, as well as the resulting member itself.

The objective is exemplarily achieved by means of the rocket engine member having an outside wall structure that includes a continuous sheet metal wall, and that included cooling channels are formed by elongated elements that are longitudinally attached to the inside of the sheet metal wall.

According to the teachings of the invention, a rocket engine member may be manufactured which presents high pressure capacity, and a low pressure drop, a long cyclic life, as well as advantageous area ratio. The manufacturing lead time and cost may also be optimized.

BRIEF DESCRIPTION OF DRAWINGS

The invention will be further described in the following, in a non-limiting way with reference to the accompanying drawings in which.

DETAILED DESCRIPTION

Figure 1:
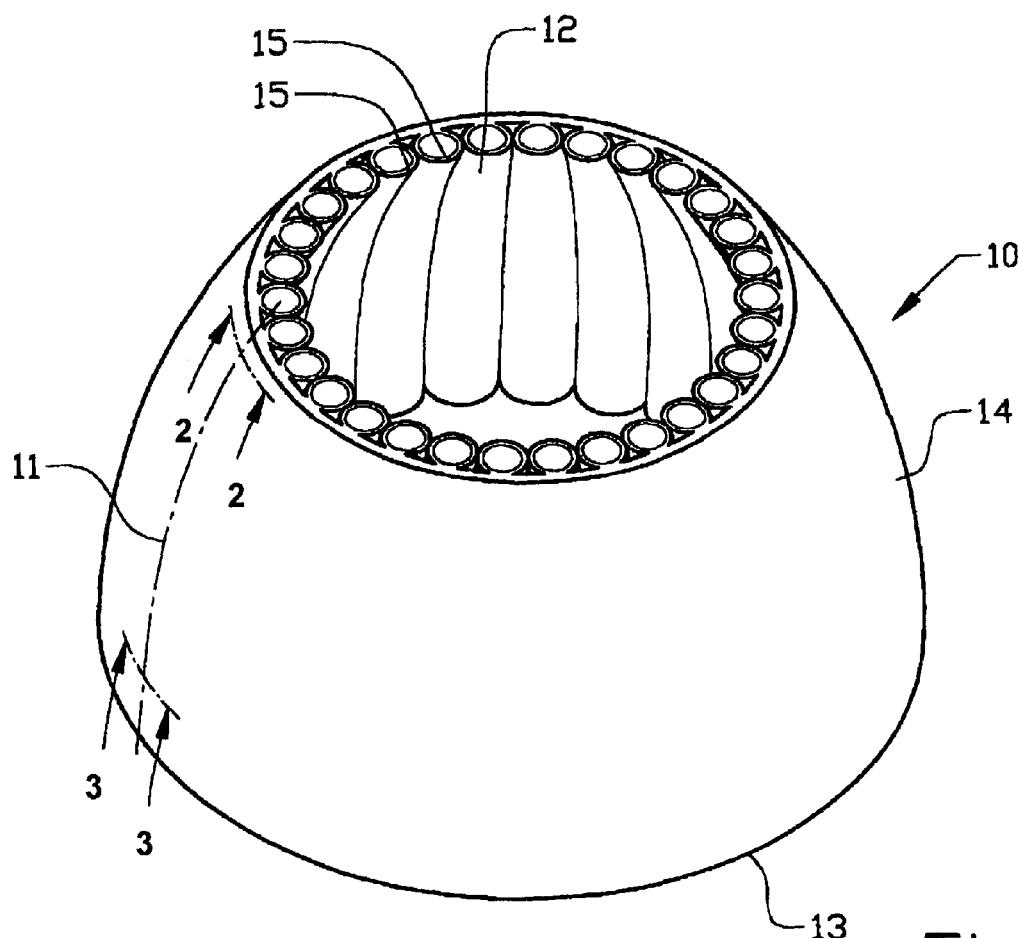
FIG. 1 is a schematic perspective view showing a nozzle configured according to the teaching of the present invention.

FIG. 1 shows a diagrammatic and somewhat simplified perspective view of an outlet nozzle 10 that is produced according to the teachings of the present invention(s). The nozzle is intended for use in rocket engines of the type using liquid fuel, for example liquid hydrogen. The working of such a rocket engine is conventional and therefore not described in detail. The nozzle 10 is cooled with the aid of a cooling medium that is preferably also used as fuel in the particular rocket engine. The invention is, however, not limited to rocket engine members of this type, but can also be used in combustion chambers and in those cases in which the cooling medium is dumped after it has been used for cooling.

The outlet nozzle is manufactured with an outer shape that is substantially bell-shaped. Thus, the nozzle 10 forms a body of revolution having an axis of revolution and a cross section that varies in diameter along said axis.

The nozzle wall is a structure comprising (included, but not limited to) a plurality of mutually adjacent, tubular cooling channels 11 extending substantially in parallel to the longitudinal axis of the nozzle from an inlet end 12 outlet to/on end 13 of the nozzle. The outside of the structure includes a continuous sheet metal wall 14. The cooling channels 11 are formed by elongated elements in the form of tubes 15, that are curved in the longitudinal direction to conform to the nozzle contour and are oriented axially along the nozzle wall. In this position, they are jointed to the metal wall by welding. The welds are preferably made by laser welding from the outside. This assembly forms a leak tight nozzle with all joints at the cool side of the structure. Further, there is no joint, or weld, attaching two adjacent tubes to each other.

Figure 2:
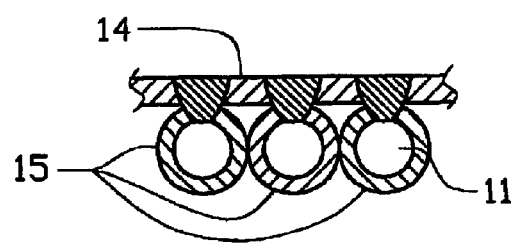
FIG. 2 is a partial sectional view taken along the line 2—2 in FIG. 1, showing three cooling channels at the inlet end of the nozzle.
Figure 3:
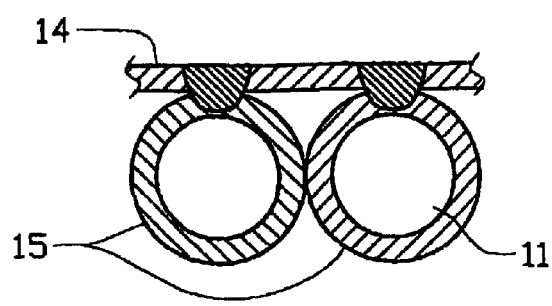
FIG. 3 is a similar view as FIG. 2, but showing two of the cooling channels taken along the line 3—3 at the outlet end of the nozzle.

The cooling channels 11 in the embodiment illustrated in FIGS. 2 and 3 are formed by circular tubes 15 having a varying cross section. The tubes 15 may be seamless and have a smaller cross section at the inlet end 12 of the nozzle than at the opposite outlet end 13. Each elongated element 15 preferably delimits only one cooling channel.

The cooling tubes 15 are mounted without gaps therebetween. At the inlet end 12 of the nozzle, the thickness of the tube material is thin to minimize the maximum temperature and to allow the tubes to be flexible to deformation of the cross section. At the outlet end 13 of the nozzle, the tubes have a larger cross section, as well as a thicker tube material. This variation in material thickness allows the tubes to adapt to increased pressure inside the tubes when the cooling medium contained therein expands. At the inlet, the tubes may be formed in an oval shape to increase the number of tubes.

The variations in tube cross section and tube material thickness are gradual in the longitudinal direction of the nozzle.

Figure 4:
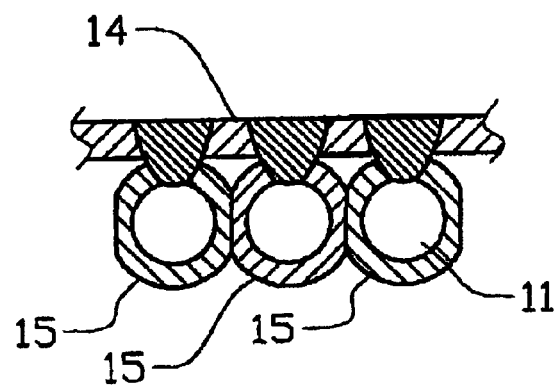
FIG. 4 is a partial sectional view from a position corresponding to that shown in FIG. 2, but illustrating an alternative embodiment of three cooling channels at the inlet end of a nozzle; according to a second embodiment of the invention.
Figure 5:
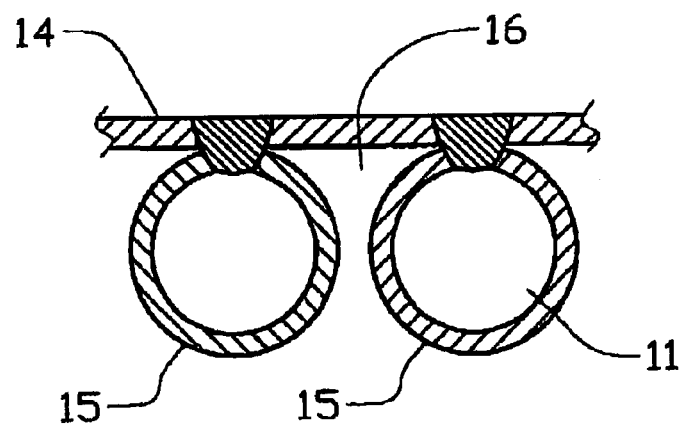
FIG. 5 is a similar view as FIG. 3, but shows cooling channels at the outlet end of the nozzle of the embodiment of FIG. 4.

FIGS. 4 and 5 show a second embodiment of the invention that is adapted for enhanced heat pickup. The cooling tubes 15 are manufactured with a constant material thickness and a gradually increasing diameter. The tubes have a smaller cross section at the inlet end 12 of the nozzle than at the opposite end. The inlet ends of the tubes have machined faces to allow a small pitch at this end of the nozzle to enable large area ratios. The cooling tubes are mounted without mutual gaps at the inlet end of the nozzle where the flame pressure and heat load is greatest.

At the outlet end 13 of the nozzle, the tubes 15 are separated in the tangential direction (provided with mutual gaps therebetween). A cavity 16 is formed between each pair of tubes 15 and the sheet metal wall 14. The gap between the tubes allows the hot rocket flame to access the cavity and thus more tube surface for enhanced heat pick up. Also, by allowing a gap between each pair of adjacent tubes, the tube may be conical and yet be acceptable to fit a bell shaped nozzle. The variation in width of the cavity 16 between two adjacent tubes is gradual in the longitudinal direction of the nozzle.

With the nozzle design described above, the amount of heat transferred to the coolant in the nozzle can be increased by a factor of as much as 1.5 compared to conventional designs.

Figure 6:
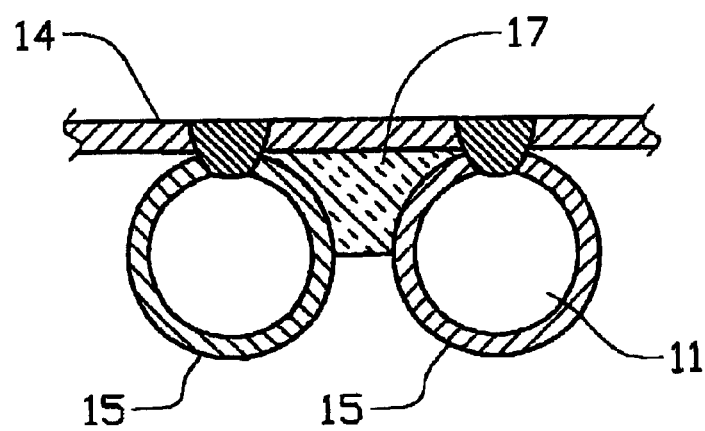
FIG. 6 is a similar view as FIG. 4, but showing another variation of the invention.

In cases where the heat load is high at the exit of the nozzle, the embodiment of the invention shown in FIG. 6 affects protection of the sheet metal wall 14 from the heat load. Thus, the cooling cavity may be filled with a thermally insulating material 17 to prevent the gas from contacting the load carrying outer shell so that the shell material temperature is limited. Alternatively, the walls may be coated with a thermally conductive material 17 for increased heat transfer to the cooling tubes. In a case where conductive material such as copper completely fills the cavity, it is possible to reach very high pressures and high area ratios. The process to apply the conductive material can be exemplarily be brazing or laser sintering.

Figure 7:
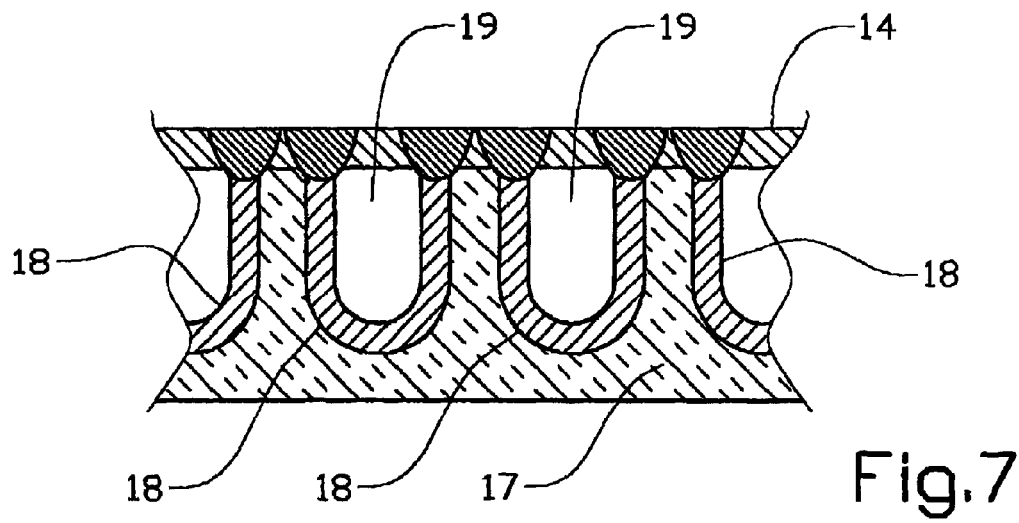
FIG. 7 is a partial sectional view showing cooling channels at the inlet end of a nozzle according to another embodiment of the invention.
Figure 8:
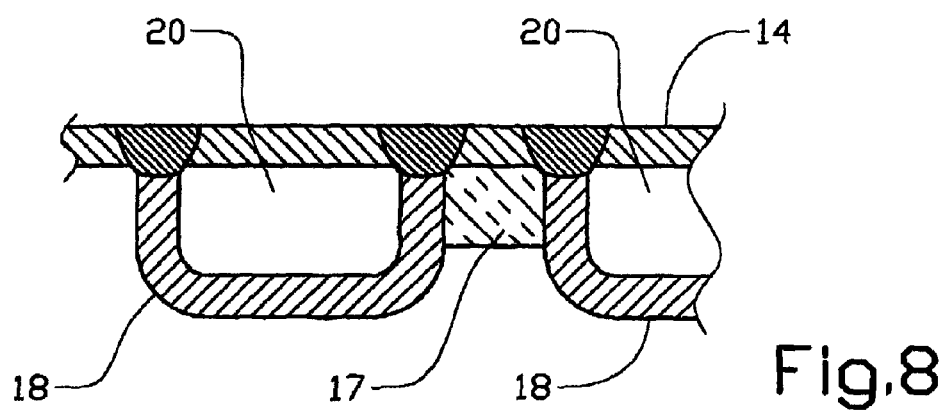
FIG. 8 is a related view of the embodiment of FIG. 7 showing cooling channels at the outlet end of the nozzle.

FIGS. 7 and 8 show another embodiment of the invention where U-formed profiles 18 are used instead of the above described circular tubes 15. The profiles have a varying cross section and a varying material thickness. The profiles are manufactured by press forming sheet metal strips. The variation in thickness is adapted to the length of the nozzle. Thus, the material thickness may increase when the cooling channel cross section is increased so that the thickness is small at the inlet end of the nozzle where the heat load is high. It is preferable to modify the metal strip thickness before folding. The structure in FIGS. 7 and 8 has been combined with the thermally insulating/conductive material 17.

It is possible to build the structures described above from the common materials for rocket engine nozzle tubes such as stainless steel and nickel based alloys. Also copper and aluminum are suitable materials.

One of the important advantages of wall structures configured according to the teachings of the present invention is that it offers a large cooling surface for increased heat absorption. The variations in cross section and tube material thickness allows for high internal pressure in the cooling channels 11. The increased wet surface, that is, the surface toward the exhaust gasses in the nozzle structure provided by the several embodiments of the invention(s) cools the boundary layer more than by a conventionally designed nozzle. The boundary layer leaving the disclosed rocket nozzle(s) will be cooler. The cooler boundary layer serves as cooling film for an eventual radiation cooled nozzle extension that may be used as a low cost solution when the heat load is limited. The nozzle extension could be less costly since the heat load is limited.

The rotational symmetric outer surface of the nozzle structure(s) configured according to the teachings of the invention(s) also provides stiffness, and if necessary, allows for attachment of stiffeners in an easy way. The single joint to the sheet metal wall isolates jackets and allows the tubes to be flexible to thermal distortion while imposing a minimum of stress concentration. The cross section of the cooling channels may be close to circular. This means that the temperature differences and associated stresses are lower than compared to sandwich walls where the flame is not in contact with the outer wall. The gap 16 between the tubes eliminates the restriction on cooling channel dimensions to form the nozzle contour. The cooling channels or tubes could be made with liner variation, which offers advantages in manufacturing.

Figure 9:
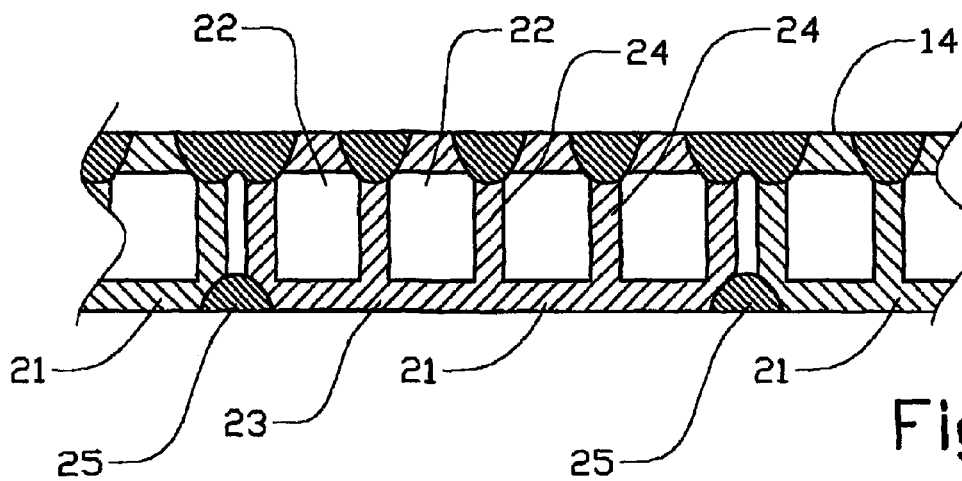
FIG. 9 is a cross-sectional view of yet another alternative embodiment of the invention.

In FIG. 9, a further embodiment of the invention is shown in a partly cut away, cross-sectional view. A plurality of elongated elements 21 are arranged next to each other. Each of the elongated elements 21 has a plate-like portion, or base portion 23, and a plurality of flanges 24, or ribs, which project from and extend along said base portion 23. The ribs 24 are elongated, arranged at a distance from each other and substantially in parallel to each other. Further, the elongated elements are attached to a continuous sheet metal wall 14. Cooling channels 22 are formed between two adjacent ribs 24 and the sheet metal wall 14. Further, two adjacent elongated elements are connected to each other by a further weld 25.

It should be appreciated that the invention is not limited to the above-described embodiments, but modifications are possible while still remaining within the scope of the presented claims.

What is claimed is:

1. A liquid fuel rocket engine member comprising:
    a body having an axis of revolution and a cross section that varies in diameter along said axis, said body further comprising a wall structure having a plurality of cooling channels; and
    an outside of the wall structure comprising a continuous sheet metal wall and the cooling channels being at least partly delimited by elongated elements that are longitudinally attached to the inside of the sheet metal wall, the elongated elements being mounted with mutual contact at the inlet end of the member and with mutual gaps at the outlet end of the member.

2. The liquid fuel rocket engine member as recited in claim 1, further comprising:
    a cross sectional area of each cooling channel being larger in a downstream end of the channel than in an upstream end of the channel.

3. The liquid fuel rocket engine member as recited in claim 1, further comprising:
    a material thickness of the cooling channel wall being larger in a downstream end of the channel than in an upstream end.

4. The liquid fuel rocket engine member as recited in claim 1, further comprising:
    a width of each of said cooling channels, in the circumferential direction of said engine member, being larger in a downstream end of the channel than in an upstream end of the channel.

5. The liquid fuel rocket engine member as recited in claim 1, further comprising:
    the cooling channels having a substantially similar cross section shape in a downstream end of the channel as in an upstream end of the channel.

6. The liquid fuel rocket engine member as recited in claim 1, further comprising:
    the cooling channels being formed by seamless tubes.

7. The liquid fuel rocket engine member as recited in claim 1, further comprising:
    a distance between two adjacent elongated elements at the outlet end of the member being filled with an insulating material.

8. The liquid fuel rocket engine member as recited in claim 1, further comprising:
    a distance between two adjacent elongated elements at the outlet end of the member being filled with a thermally conductive material.

9. A method for manufacturing a liquid fuel rocket engine member comprising:
    providing a body having an axis of revolution and a cross section that varies in diameter along said axis, and the body having a wall structure comprising a plurality of cooling channels;
    attaching a plurality of elongated elements to a curved sheet metal wall arranged to form the engine member, wherein the cooling channels are formed by at least said elongated elements and wherein the elongated elements are mounted with mutual contact at the inlet end of the member and with mutual gaps at the outlet end of the member.

10. The method as recited in claim 9; further comprising:
    forming a sheet metal wall having a wall section corresponding to the desired member section.

11. The method as recited in claim 9; further comprising:
    defining the cooling channels by said sheet metal wall.

12. The method as recited in claim 9; further comprising:
    attaching the cooling channels to the sheet metal wall by welding from the outside of the wall.

13. A liquid fuel rocket engine member comprising:
    a body having an axis of revolution and a cross section that varies in diameter along said axis, said body further comprising a wall structure having a plurality of cooling channels; and
    an outside of the wall structure comprising a continuous sheet metal wall and the cooling channels being at least partly delimited by elongated elements that are longitudinally attached to the inside of the sheet metal wall, the elongated elements being mounted with mutual gaps at the inlet end of the member that expand to greater mutual gaps at the outlet end of the member.

14. The liquid fuel rocket engine member as recited in claim 13, further comprising:
    a cross sectional area of each cooling channel being larger in a downstream end of the channel than in an upstream end of the channel.

15. The liquid fuel rocket engine member as recited in claim 13, further comprising:
    a material thickness of each cooling channel wall being larger in a downstream end of the channel than in an upstream end.

16. The liquid fuel rocket engine member as recited in claim 13, further comprising:
    a width of each of said cooling channels, in the circumferential direction of said engine member, being larger in a downstream end of the channel than in an upstream end of the channel.

17. The liquid fuel rocket engine member as recited in claim 13, further comprising:
    said cooling channels having a substantially similar cross section shape in a downstream end of the channel as in an upstream end of the channel.

18. The liquid fuel rocket engine member as recited in claim 13, further comprising:

said cooling channels being farmed by seamless tubes.

19. The liquid fuel rocket engine member as recited in claim 13, further comprising:

a distance between two adjacent elongated elements at the outlet end of the member being filled with an insulating material.

20. The liquid fuel rocket engine member as recited in claim 13, further comprising:

a distance between two adjacent elongated elements at the outlet end of the member being filled with a thermally conductive material.

21. A liquid fuel rocket engine member comprising:

a body having an axis of revolution and a cross section that varies in diameter along said axis, said body further comprising a wall structure including a plurality of cooling channels; and said wall structure comprising a sheet metal wall with said plurality of cooling channels being mounted at an inside of said sheet metal wall with mutual contact between adjacent cooling channels at inlet ends thereof and with mutual gaps therebetween at outlet ends thereof.

22. The liquid fuel rocket engine member as recited in claim 21, further comprising:

a cross sectional area of each cooling channel being larger in a downstream end of the channel than in an upstream end of the channel.

23. The liquid fuel rocket engine member as recited in claim 21, further comprising:

a material thickness of each cooling channel wall being larger in a downstream end of the channel than in an upstream end.

24. The liquid fuel rocket engine member as recited in claim 21, further comprising:

a width of each of said cooling channels, in the circumferential direction of said engine member, being larger in a downstream end of the channel than in an upstream end of the channel.

25. The liquid fuel rocket engine member as recited in claim 21, further comprising:

said cooling channels having a substantially similar cross section shape in a downstream end of the channel as in an upstream end of the channel.

26. The liquid fuel rocket engine member as recited in claim 21, further comprising:

said cooling channels being formed by seamless tubes.

27. The liquid fuel rocket engine member as recited in claim 21, further comprising:

a distance between two adjacent elongated elements at the outlet end of the member being filled with an insulating material.

28. The liquid fuel rocket engine member as recited in claim 21, further comprising:

a distance between two adjacent elongated elements at the outlet end of the member being filled with a thermally conductive material.

* * * * *